United States Patent

Hirayama et al.

[11] Patent Number: 5,911,040
[45] Date of Patent: Jun. 8, 1999

[54] AC CHECKPOINT RESTART TYPE FAULT TOLERANT COMPUTER SYSTEM

[75] Inventors: Hideaki Hirayama, Kanagawa-ken; Takeo Takahashi, Tokyo, both of Japan

[73] Assignee: Kabushiki Kaisha Toshiba, Kawasaki, Japan

[21] Appl. No.: 08/810,459

[22] Filed: Mar. 4, 1997

Related U.S. Application Data

[63] Continuation of application No. 08/409,091, Mar. 23, 1995, abandoned.

[30] Foreign Application Priority Data

Mar. 30, 1994 [JP] Japan ................................ 6-060614

[51] Int. Cl.$^6$ .................................................... G06F 11/00
[52] U.S. Cl. ............................... 395/183.14; 395/182.11; 395/182.15; 395/591; 395/733
[58] Field of Search .......................... 395/183.14, 183.11, 395/183.13, 183.15, 185.02, 569, 591, 733, 182.15; 364/267, 267.91, 946.2, 182.11, 182.13, 182.14, 185.04; 371/2.1, 3, 20.4, 24, 25.1, 26, 67.1

[56] References Cited

U.S. PATENT DOCUMENTS

| | | | |
|---|---|---|---|
| 3,736,566 | 5/1973 | Anderson | 395/182.13 |
| 3,937,938 | 2/1976 | Matthews | 395/183.22 |
| 3,996,567 | 12/1976 | Avsan | 395/557 |
| 4,247,894 | 1/1981 | Beismann | 364/200 |
| 4,635,193 | 1/1987 | Moyer | 364/200 |
| 4,802,165 | 1/1989 | Ream | 371/19 |
| 4,852,092 | 7/1989 | Makita | 395/182.15 |
| 5,140,671 | 8/1992 | Hayes | 395/76 |
| 5,159,597 | 10/1992 | Monahan et al. | 395/181 |
| 5,257,358 | 10/1993 | Cohen | 395/375 |
| 5,331,673 | 7/1994 | Elko et al. | 395/183.19 |
| 5,333,192 | 7/1994 | McGinn | 379/399 |
| 5,379,301 | 1/1995 | Sato | 395/183.14 |
| 5,410,685 | 4/1995 | Banda et al. | 395/183.14 |

OTHER PUBLICATIONS

Nicholas S. Bowen & Dhiraj K. Pradhan, Vintual Checkpoints: Architecture & Performance, IEEE pp. 516–525, vol. 41, No. 5, May 1992.

*Primary Examiner*—Dieu-Minh Le
*Attorney, Agent, or Firm*—Oblon, Spivak, McClelland, Maier & Neustadt, P.C.

[57] ABSTRACT

A checkpoint restart type computer system which executes a program upon taking a checkpoint periodically for rolling back to a prior checkpoint if an error status is detected during an execution of a program, including a memory for storing a program which includes a plurality of ESD steps between particular two checkpoints, and a processor for executing the program with holding a checkpoint periodically. The processor includes a memory for maintaining a checkpoint image which has been taken during execution of the program. The ESD steps in the program contain at least a designated execution level for the ESD step and an error status detecting code. The computer system further includes a designator for designating the execution level for the program and a classifier for classifying the execution of the ESD steps by comparing the designated execution level and the allowed execution level for the ESD sequence. When an error status is detected during the execution of the program, the designator changes the execution level of the program from a low to a high frequency so as to increase the number of executions of the ESD steps for specifying a particular position of an error status as early as possible.

6 Claims, 9 Drawing Sheets

| MODUEL NO. | ALLOWED EXECUTION LEVEL FOR ESD STEP ( LESS THAN ) |
|---|---|
| AA1 | 1 |
| AA2 | 2 |
| AA3 | 3 |
| AB1 | 3 |
| AB2 | 3 |
| BA1 | 2 |

POST PROCESS AFTER DETECTION OF AN ERROR

| PS1 | DISPLAY A WARNING MESSAGE AND PROCEED THE EXECUTION |
|---|---|
| PS2 | RESTART FROM THE PREVIOUS CHECK POINT |
| PS3 | TRANSFER THE CONTROL TO A DEBUGGING OPERATION |
| PS4 | ABORT THE EXECUTION |
|  |  |

FIG. 6

20 PROGRAM X

```
⋮
ESD          Aa       (LEVEL 1) ——— 51
⋮
ESD          Ab       (LEVEL 2) ——— 53
⋮
ESD          Ba       (LEVEL 3) ——— 55
⋮   BUG X    230
ESD          Ca       (LEVEL 3) ——— 57
⋮
ESD          Cb       (LEVEL 3) ——— 59
⋮
ESD          Da       (LEVEL 2) ——— 61
⋮
ESD          Db       (LEVEL 3) ——— 63
⋮
ESD          Dc       (LEVEL 3) ——— 65
⋮
ESD          Ea       (LEVEL 3) ——— 67
⋮
ESD          Eb       (LEVEL 2) ——— 69
⋮
ESD          Fa       (LEVEL 1) ——— 71
⋮
```

AC CHECKPOINT RESTART TYPE FAULT TOLERANT COMPUTER SYSTEM

This application is a Continuation of application Ser. No. 08/409,091, filed on Mar. 23, 1995, now abandoned.

BACKGROUND OF THE INVENTION

1. Field of the Invention

This invention relates to a checkpoint restart type fault tolerant computer system of a high reliability and method for detecting a program error without lowering the efficiency of the system.

In particular, this invention relates to a checkpoint restart type fault tolerant computer system having a higher operational speed and including a plurality of error status detecting steps in a program.

More particularly, this invention relates to a check point restart type computer system of a high reliability which can operate with a higher operational speed during a normal operation and which can quickly detect a programming error status when a program error status occurs during a debugging operation.

This invention further relates to a checkpoint based fault tolerant computer system which is suitable for detecting a program error status of a mutual exclusion process between a parallel reprocessing in a system.

2. Discussion of the Background

Recently, a fault tolerant computer system is available for keeping a high reliability of the computer system.

There are two types of fault tolerant computer systems. One is to avoid a fault due to hardware errors in the system. And the other is to detect a fault due to a software error status in a program of the system.

In order to avoid hardware errors, a fault tolerant computer is usually comprised by a dual system. And if a fault due to a hardware error occurs, the system operation is immediately changed to the back up system. This dual construction of the system is useful for avoiding a fault due to a hardware error.

However, even in such a dual system, it is impossible to avoid a fault due to a program error or a programming bug.

Accordingly, it is important to detect an error status in a program as early as possible. In order to detect a programming error or a bug, it is useful to insert a plurality of error status detection (hereinafter referred to as an 'ESD') steps in a program.

In a checkpoint restart type fault tolerant computer system, a programmed process is executed and when an error is detected in an execution between two particular checkpoints, the executed process is rolled back to a prior checkpoint for restarting the execution.

For detecting a programming error or a bug in a program, it is useful to insert a plurality of ESD steps in a program.

However, the execution of many of the ESD steps deteriorates an operational speed of the system during a normal operation.

In order to avoid the deterioration of the operational speed of the system, it is desirable to reduce, as low as possible, the number of executions of the ESD steps in a program during a normal operation.

On the contrary, if a fault due to a programming bug appears, it is desirable to execute as many ESD steps as possible for specifying the location of the bug promptly.

SUMMARY OF THE INVENTION

Accordingly, it is an object of the present invention to provide a checkpoint restart type fault tolerant computer system having a high reliability and a high operational speed and a method for eliminating a programming error in a program as quickly as possible.

It is another object of this invention to provide a checkpoint based fault tolerant computer system having a high reliability while maintaining a high operational speed.

It is still another object of this invention to provide a method for eliminating a programming error promptly by changing the execution levels for a plurality of ESD steps in a program between particular two checkpoints.

A checkpoint restart type computer system in accordance with the present invention executes a program by taking a checkpoint periodically for rolling back to a prior checkpoint if a failure is detected during the execution of a program.

The checkpoint restart type computer system in accordance with the present invention includes a memory for storing a program which includes a plurality of ESD steps between particular two checkpoints and a processor for executing the program while periodically holding a checkpoint. The processor includes a holder for maintaining a checkpoint image which has been taken during the execution of the program. The ESD steps in the program contain at least a designated execution level for the ESD step and an error status detecting code.

The checkpoint restart type computer system of the present invention further includes a designation means for designating the execution level for the program and a classification means for classifying the execution of the ESD steps under the designated execution level. When an error status is detected during the execution of the program, the designation means changes the execution level for the program from a low level to a high frequency level so as to increase the number of the execution of the ESD steps for specifying a particular position of an error status as early as possible.

BRIEF EXPLANATION OF THE DRAWINGS

FIGS. 10(*a*) to 10(*c*) are example steps for specifying the particular position 230 of the bug X which is detected during an execution between particular two checkpoints 100 and 101 by incrementing the execution level for the ESD step;

FIGS. 11(*a*) is a flowchart of a process table including two link lists of two entries; and FIG. 11(*b*) is an illustration of processing which occurs when different processors instruct adding entries to a program list.

DETAILED EXPLANATION OF THE PREFERRED EMBODIMENTS

Figure 1:
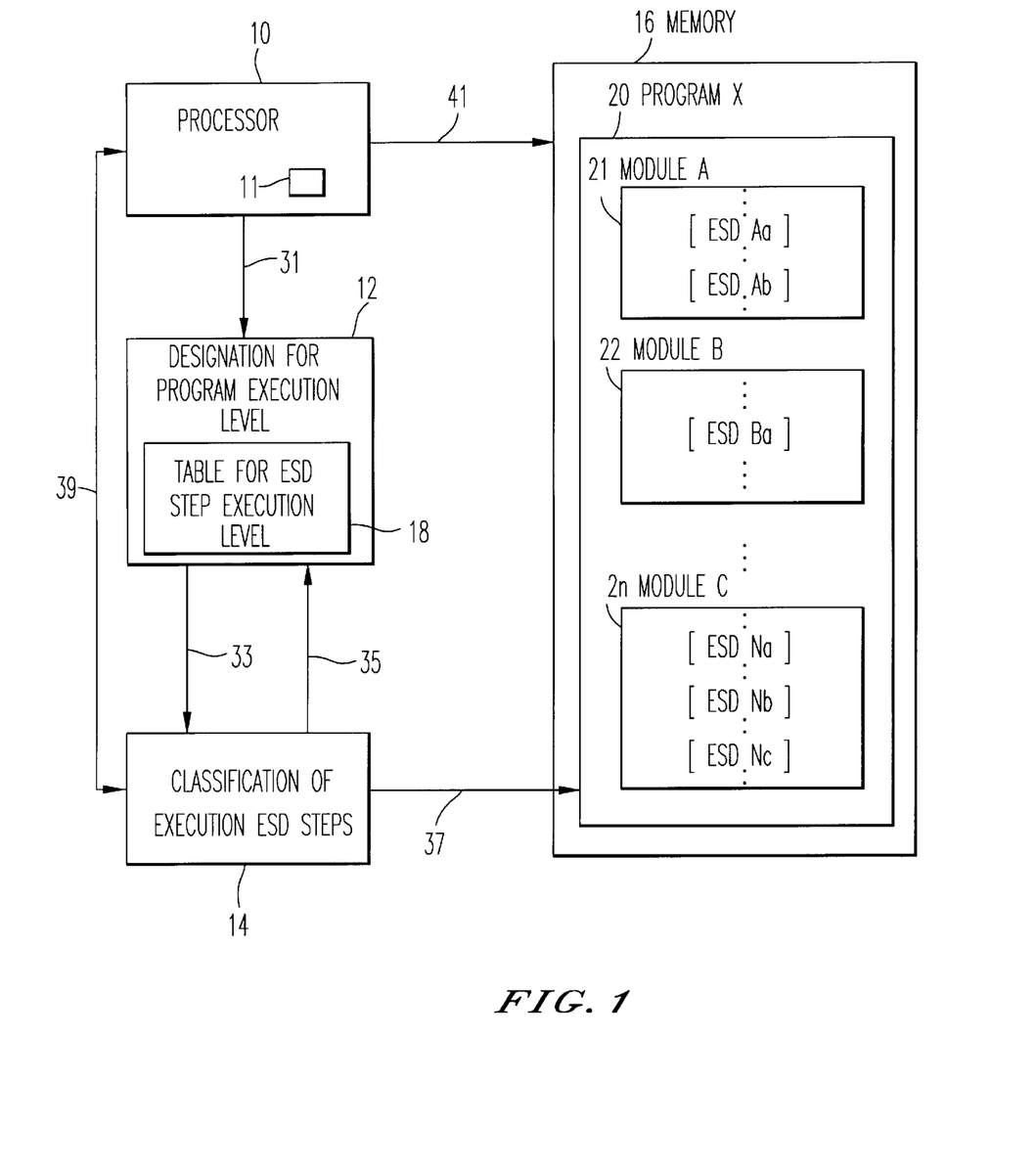
FIG. 1 is a schematic diagram of a checkpoint restart type computer system showing one preferable embodiment of the present invention.

FIG. 1 shows a schematic diagram of a preferred embodiment of a checkpoint restart type computer system according to the present invention.

A processor 10 controls the entire operations of the system and executes an operation instructed by a program 20 which is stored in a memory 16.

The processor 10 and the memory 16 are coupled with each other through a memory bus 41 for reading and writing information and data.

The program 20 is comprised of a plurality of functional modules 21, 22,. . . and 2n.

The processor 10 further controls information for each modules 21 to 2n in the program 20.

Each of the modules include a selected number of error status detection steps (hereinafter referred to as ESD steps). For example, the module 21, 22 and 2n include two ESD steps, one ESD step and three ESD steps, respectively.

In a checkpoint restart type fault tolerant computer system, the processor 10 further includes a temporary memory 11 for holding an executed operation of a program between particular two checkpoints in order to restart the execution of the program by rolling back to a previous checkpoint of the two particular checkpoints when an error status is detected between them.

The processor 10 executes the ESD steps as designated by a designation means 12 and classified by a classification means 14.

Figure 3:
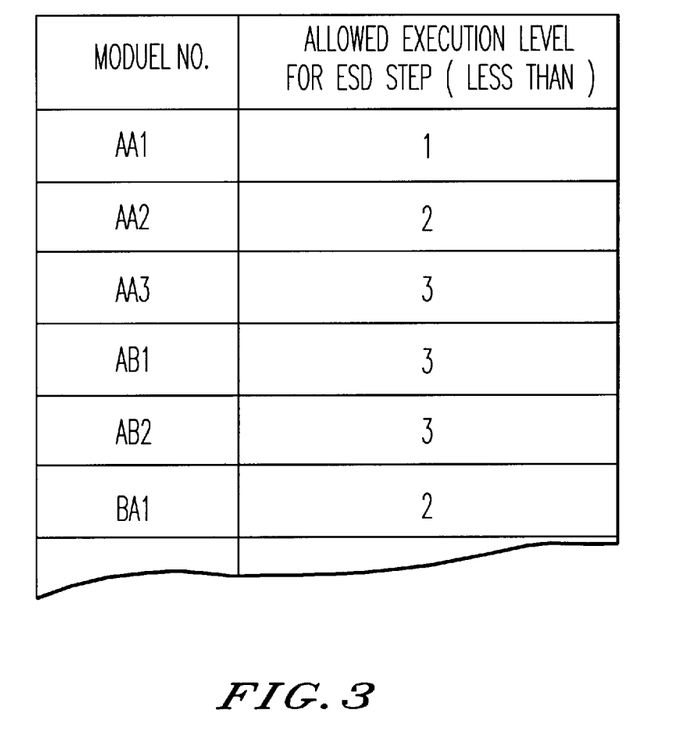
FIG. 3 is a table which is provided in a designating means 12 shown in FIG. 1 for designating an execution level of an ESD step for the respective module in the program.

The designation means 12 designates the execution level for the respective ESD steps in the modules. A table 18 in the designation means 12 allows the execution of the ESD step as designated for the respective modules. FIG. 3 is an example designation for the respective ESD steps in the table 18. In this table, the modules (AA1), (AA2 and BA1), and (AA3,AB1, and AB2) are respectively designated so as to execute the ESD step when the program execution level is designated at less than 1, less than level 2 and less than level 3, respectively. Namely, the table 18 designates which ESD step should be executed under the designation of the program execution level.

When an ESD code is detected during an execution of the program 20, the processor requests to the classification means 14 whether or not the ESD step should be executed under the designation of the program execution level at that time. The classification means 14 checks the designated execution level for the respective ESD step with reference to the module number attached to the ESD code and the corresponding designated execution level in table 18.

Then the classification means selects the execution of the ESD step by comparing the following condition (1): Designated program execution level≧designated execution level for the ESD step . . . (1).

If an error status in the program 20 is detected during the execution of the program, the execution rolls back to a prior checkpoint which previously was held in holder 11. And the processor instructs the designation means 12 to increment the allowed execution level for the program.

Figure 2:
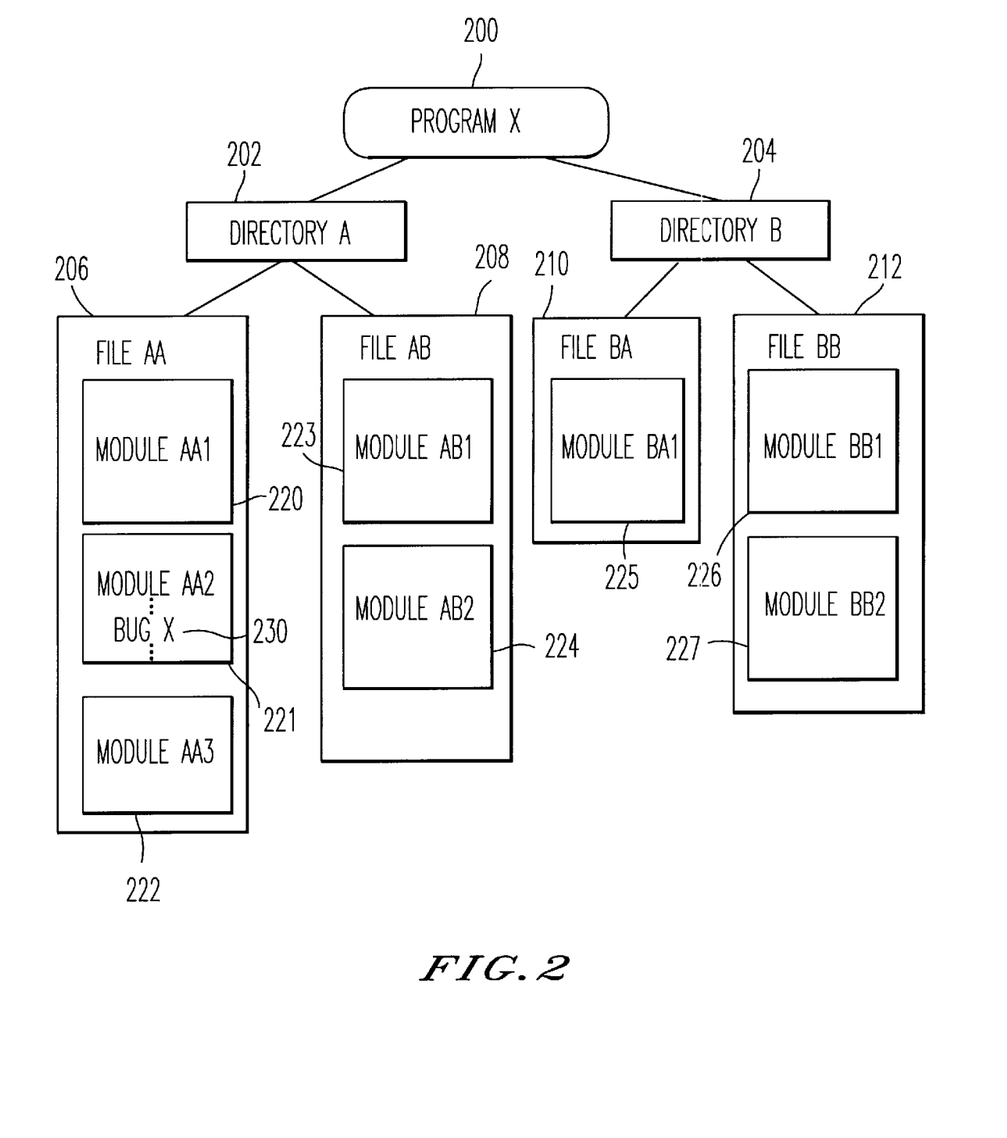
FIG. 2 is a schematic illustration of the organization of a program which is executed in the computer system shown in FIG. 1.

FIG. 2 illustrates an example of a program 20 stored in a memory 16. The program 20 is comprised of two directories A and B. The respective directory is comprised of two files. The B directory includes two files BA and BB.

The file AA includes three functional modules AA1, AA2 and AA3, and the file AB is comprised of two functional modules AB1 and AB2. The file BA comprises one module BA1, and the file BB includes two modules BB1 and BB2.

If an error status or a bug 230 locates in the module AA2 in the program 200, the biggest influence of the bug 230 often appears in the module AA2 itself. The adjacently located modules AA1 and AA3 in the same file AA also receive influence from the bug 230.

The other modules located much farther from the bug 230 receive almost no influence from the bug 230. Thus, the modules BA1, BB1 and BB2 are not affected by the bug 230. Consequently, each of the modules must be selectively assigned a different number of ESD steps and they have to be designated with a different execution level for the ESD steps independently depending upon the possibility of a bug appearance.

In FIG. 3, the module AA1 is designated so as to execute the ESD steps when the execution level is designated less than 1. The modules AA2 and BA1 are designated to execute the ESD steps when the designated level is less than 2. That means the steps of levels 1 and 2 are executed.

The modules AA3, AB1 and AB2 are designated so as to execute the ESD steps when the designation is less than level 3. That means, all of the ESD steps of the levels 1, 2 and 3 are executed.

To increment the execution level of the ESD step means to increase number of the execution of the ESD steps.

In this embodiment, the execution levels are executed if the executing condition meets the "less than" designations. The designation means 12 increments the execution level of the program in order to increase the number of the execution of the ESD steps.

It is possible to designate that the execution level for the module AA1 in FIG. 3 as more than the level 3. In this case, the modules AA3 and AB1 are designated as more than the level 1.

The designation means 12 increments the execution level of the program in order to increase the number of the ESD execution level.

The designation means 12 increases the execution levels in the table for the respective modules when the processor detects an error status during an execution of the program.

Figure 4:
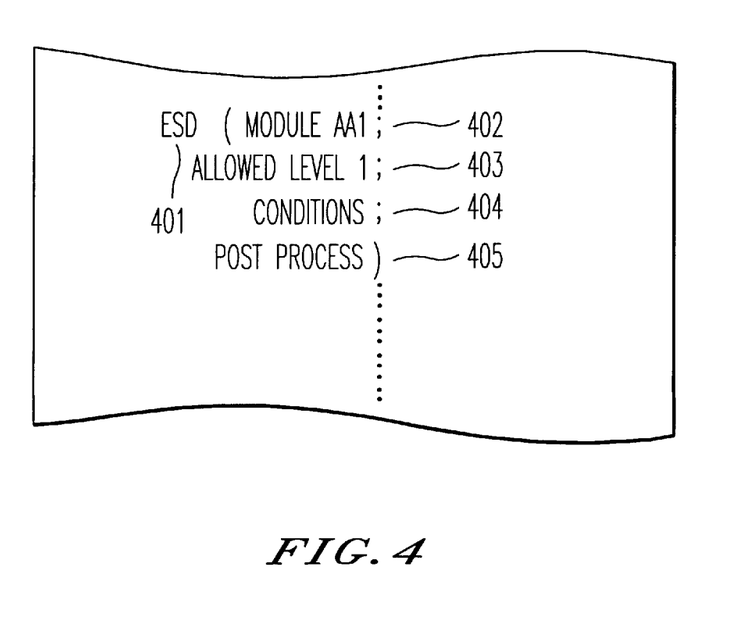
FIG. 4 is an example of contents of an ESD step.

FIG. 4 illustrates the contents in an ESD step 401. The ESD step 401 includes a module number identification part 402, an execution level designating part 403, an error status judging condition part 404 and a post process identification part 405.

Figure 5:
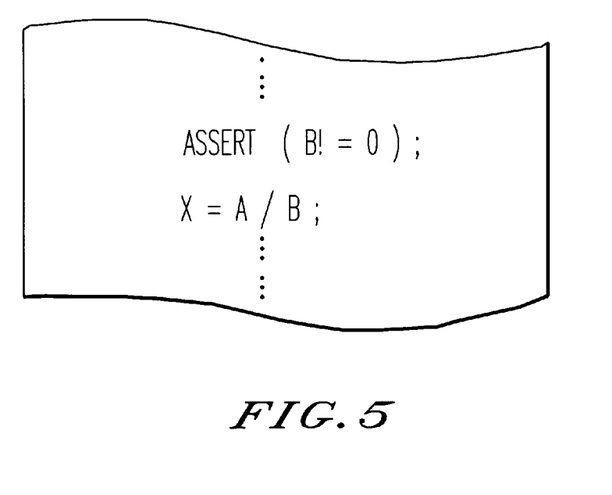
FIG. 5 is an ASSERT macro instruction in C-language, as an example of the ESD step.

FIG. 5 is an "ASSERT" macro instruction by the programming language "C".

In this ASSERT instruction, X=A/B is a normal operation by the program, and ASSERT B!=0 is a condition for judging an error status.

Figure 6:
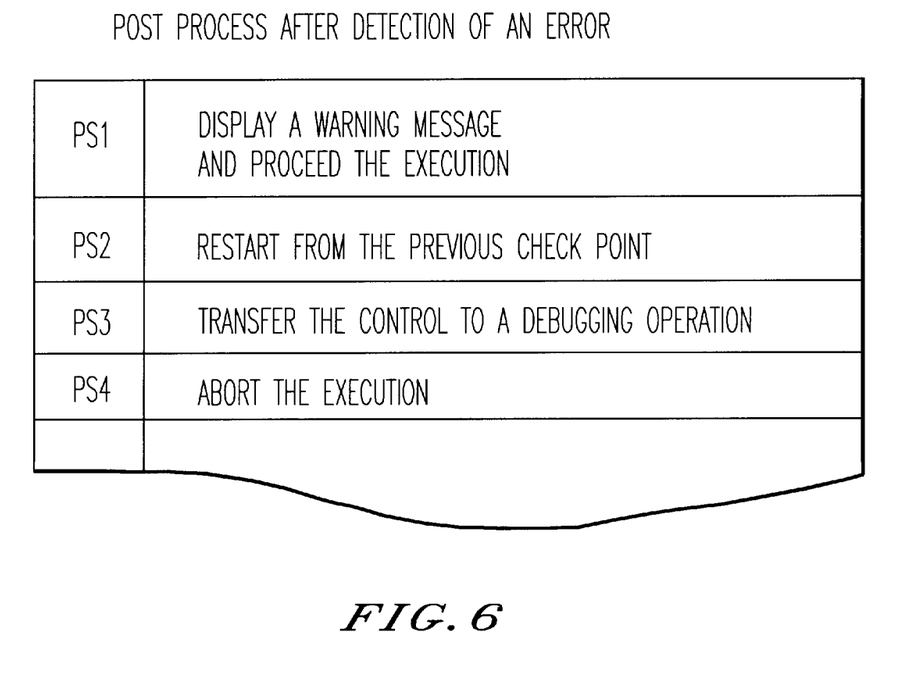
FIG. 6 is an illustration of examples of the post processes in an ESD process when an error status is detected.

FIG. 6 shows some examples of the post processes 405 in the ESD step 401 when an error status is detected under the judging conditions 404 in an ESD step.

The first example of the post process PS1 indicates to proceed or continue the execution of the program after displaying a warning message.

In this case, the processor instructs to display the warning message and the execution of the program proceeds.

The second example of the post process PS2 instructs to restart the execution of the program by using a checkpoint image which is stored in the temporary memory 11 in the controller 10 in FIG. 1.

The third example of the post process PS3 indicates to transfer the system control to a debugging operation. The controller transfers the execution of the program to a debugging operation.

And the last example of the process PS4 instructs to abort the program execution at that point of an error. The controller aborts the execution of the program when a fault meets the error status judging condition.

Other instructions are possible by depending upon the system requirements.

Turning to FIG. 1, the classification means 14 selects the plurality of ESD steps in the respective modules into the steps which are executed and the other steps which should not be executed under a predetermined execution level for the program.

When an error status is detected during an execution of the program 20, the processor sends an error detection signal 39 to the classification means 14.

The classification means 14 delivers a module specification signal 35 to the designation means 12 in order to check the designated execution level for the specified module. By an instruction from the classification means 14, the ESD code in the step is executed to detect the error status. When the error status is detected, the processor instructs the designation means to increment the designated execution level for the program from a low execution level to a higher level in order to detect a specified position of the error status.

Figure 7:
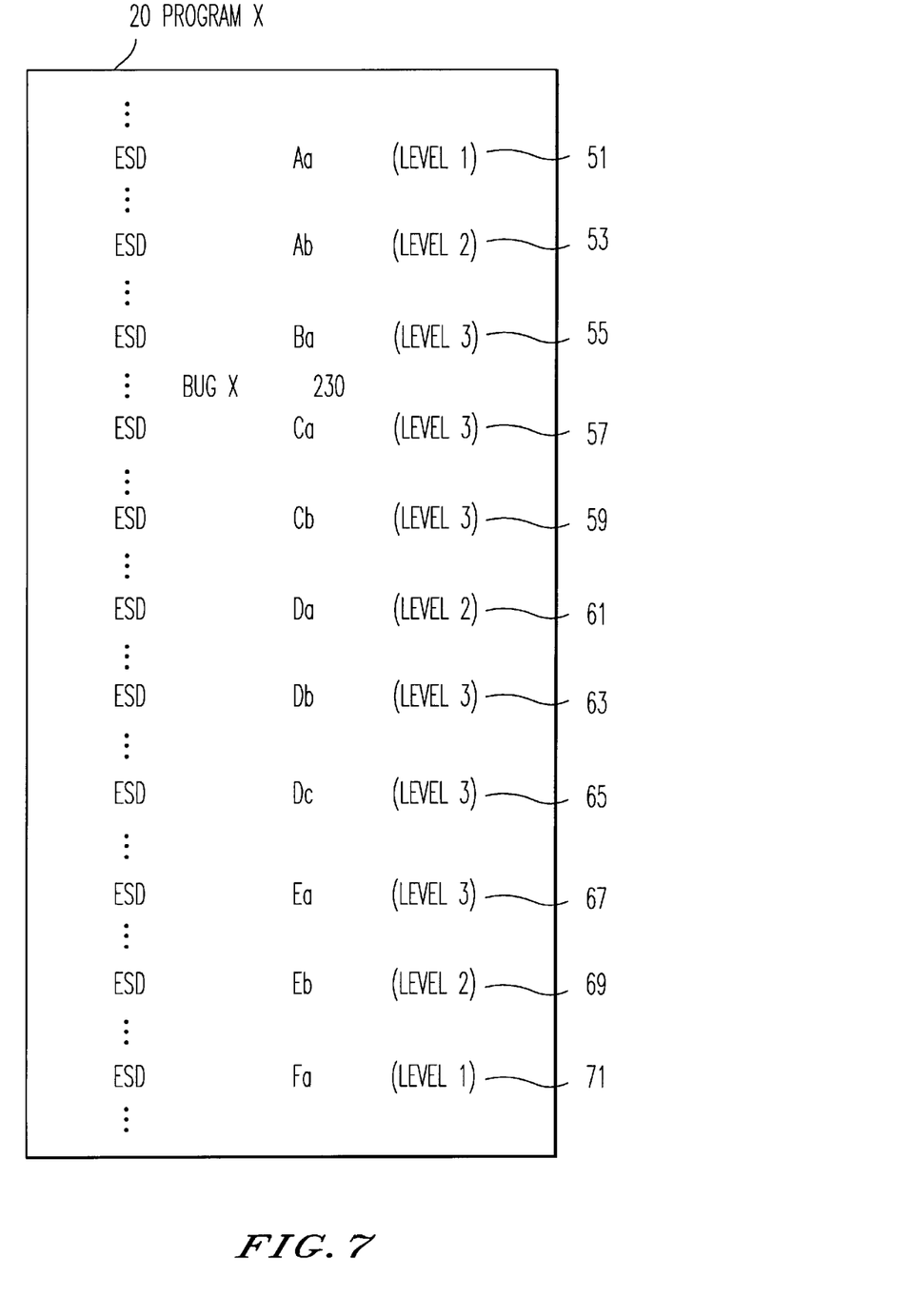
FIG. 7 is an example of the program 20 in FIG. 1 which includes a bug X between the ESD steps Ba and Ca.

In FIG. 7, the ESD steps Aa to Fa are located at a predetermined regular interval and the respective step is designated a different execution level.

The ESD steps 51 and 71 are designated so as to execute the ESD code when the execution level of the program is designated at the level 1. The ESD steps 53, 61 and 69 execute when the execution level of the program is designated at the level 2. The other ESD steps 55, 57, 59, 65, and 69 are executed when the program execution level is designated at the level 3.

During a normal condition, the execution level is usually designated at a lower level, for example, the level 1.

In this case, the ESD steps 51 and 71 only are executed. In this case, the ESD code in the ESD steps 51 and 71 are executed during the execution of the program. If an error status or a bug 230 is detected during the execution, the processor instructs the designation means to increment the execution level of the program up to the highest level 3. When the program execution level is designated at the highest level, all of the inserted ESD steps between the two checkpoints are executed for specifying the particular position of the error status as early as possible.

Figure 8:
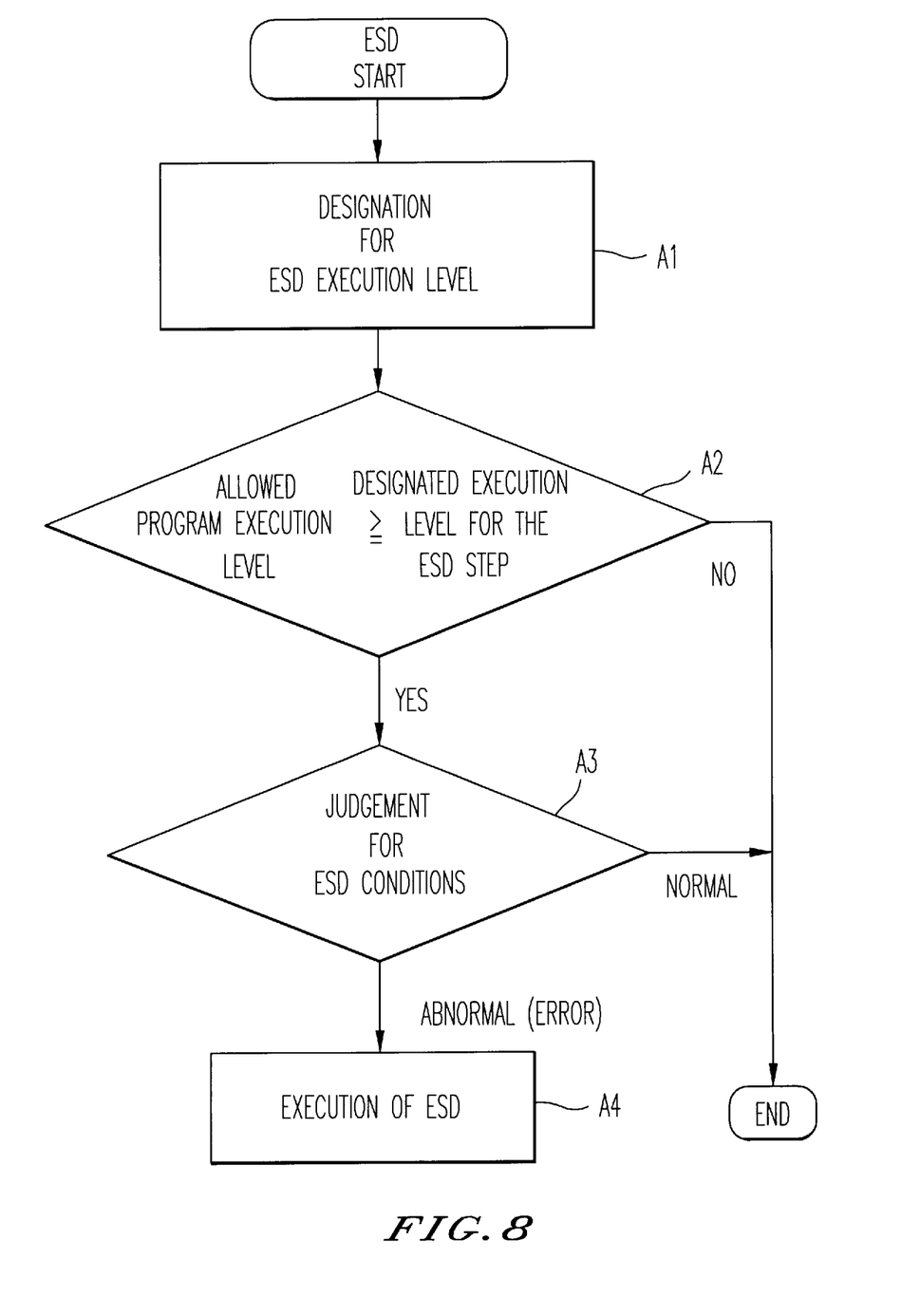
FIG. 8 is a flow chart for explaining a method for classifying the ESD steps whether or not the ESD step should be executed under a special condition.

FIG. 8 explains the method for classifying the inserted ESD steps into ones which should be executed at the designation level of the program and others which should not be executed at the designated program execution level.

At the first step A1, when the processor detects an ESD step during the execution of the program, it instructs the classification means to check the designated execution level for the ESD step in the table in the designation means. Then, at the second step A2, the classification means compares the designated program execution level and the designated execution level for the ESD step. If the execution level for the program is higher than the ESD execution level, the ESD code is executed and the ESD condition is judged for specifying whether or not the failure is an error status at the step A3. If the error status is judged, the ESD step is executed at the step A4.

If the designated program execution level is smaller than the designated execution level for the ESD step at the step A2, the ESD step is not executed and the classification is ended.

A checkpoint restart type computer system proceeds with execution of the program between a particular two checkpoints by holding an image of the taken checkpoint in a temporary memory for restarting the execution from that checkpoint when an error status is detected between the particular two checkpoints.

As explained before, it is desirable to execute as many ESD steps as possible between two checkpoints in order to specify a particular position of an error status as quickly as possible. It is also desirable to insert the error detection points at a shortest interval as possible.

However, the insertion of many numbers of the ESD steps deteriorates the operational speed of the primary operation of the program.

In the system of the present invention, it is considered to increment the program execution level from a lower level during a normal operation to a higher level during a debugging operation for specifying a particular position of an error as quickly as possible.

FIGS. 9 and 10(a) to 10(c), explain how to specify the particular module having a bug as quickly as possible.

Figure 9:
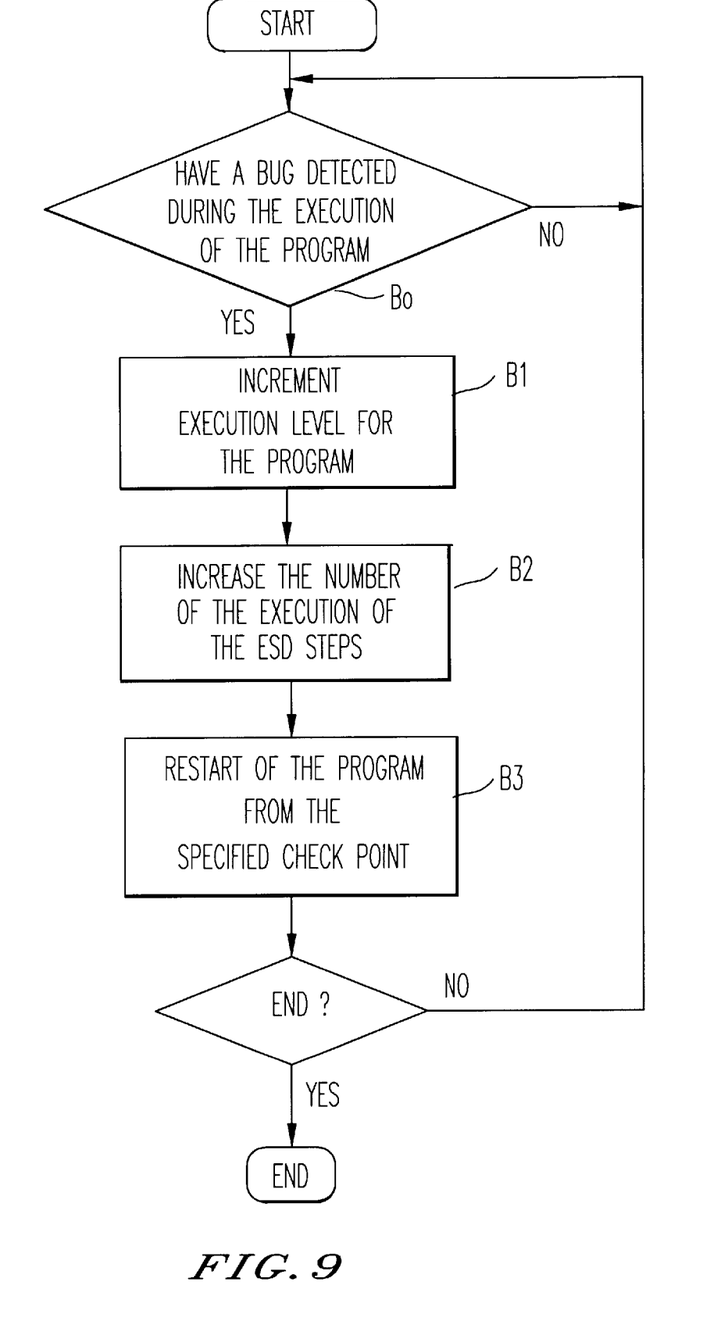
FIG. 9 is a flow chart for explaining how to detect a particular position of an error status or a bug in a program.

During a normal condition, the designation means designates the execution level of the program at the lowest level.

Figure 10A:
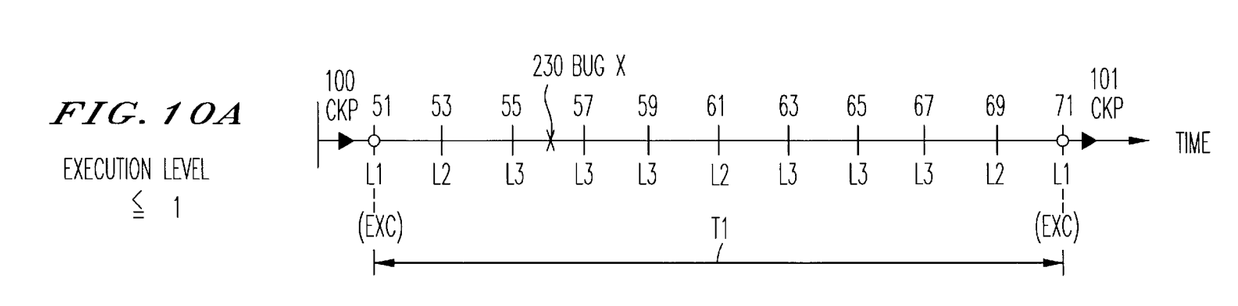

As shown in FIG. 10(a), the execution level of the program is designated at the lowest level, level 1, during a normal condition.

In this case, only two of the steps at 51 and 71 are executed during an execution of the program and the other ESD steps are not executed since they do not meet the classification condition.

Consequently, even if a bug appeared during the execution of the program as shown in FIG. 10(a), the fault is not detected until the completion of the execution between the two checkpoints 100 and 101.

Figure 10B:
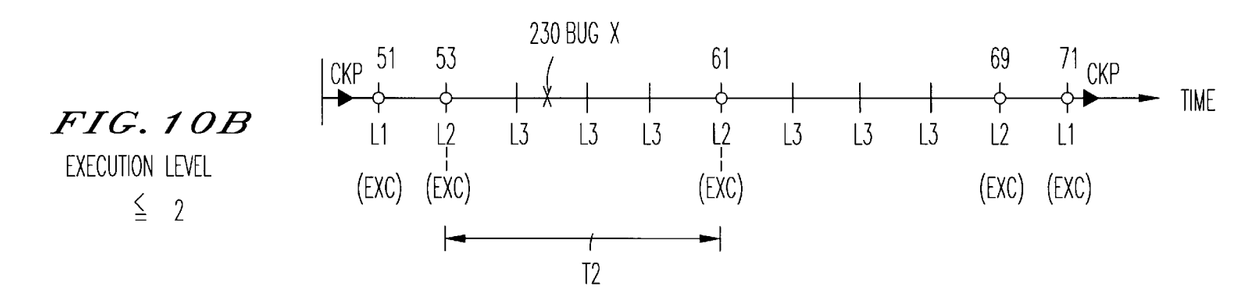

In FIG. 10(b) the program execution level is incremented so as execute the steps if they are designated as under the level 2. In this case, the ESD steps 51, 53, 61, 69 and 71 are executed during the execution of the program between the checkpoints 100 and 101.

Figure 10C:
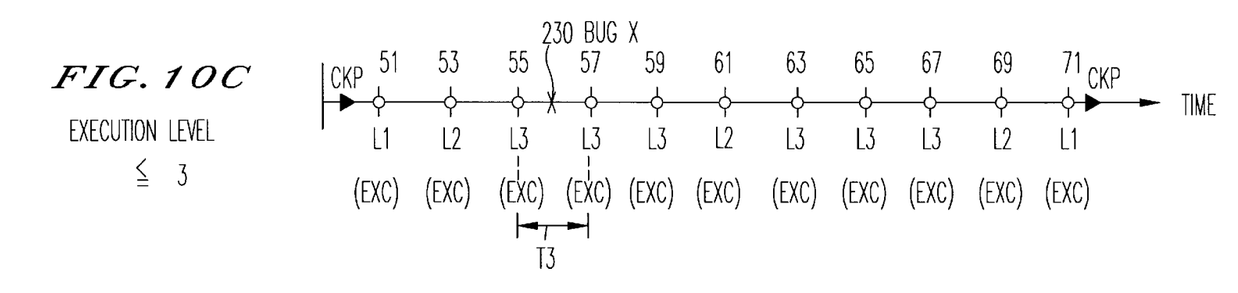

In FIG. 10(c), the program execution level is incremented so that all of the ESD steps between the two checkpoints 100 and 101 are designated to execute during the execution of the program.

As understood from FIGS. 10(a) to 10(c), the feature of this invention is to increment the program execution level for a debugging operation, although the higher efficiency of the program execution can be maintained during a normal operation of the system.

In this example, the program execution level is incremented gradually 1 by 1. The amount of increase of the execution level, for example, 2 by 2, is also possible to designate.

In FIG. 10(c), the bug 230 is detected after execution of the ESD steps at the point 57 in the shortest time interval T3.

According to the present invention, the designated execution level for the program is at a lower level during execution of a normal operation for the system so as to minimize the number of the execution of the ESD steps. When an error status is detected during the execution of the program, the system enters a debugging operation, and the processor instructs the designation means to change the program execution level so as to increase the number of the execution of the ESD steps for specifying the position of the error status in the program as promptly as possible.

The change of the execution levels is particularly useful for a checkpoint restart type fault tolerant computer system which includes a plurality of ESD steps at a predetermined interval between two checkpoints.

As explained above, the method of the present invention is very useful both for a primary operation of the system and for a program debugging operation since the program execution level can change depending upon the purpose of the operation of the system.

Accordingly, the method for detecting an error status in a program for a checkpoint based computer system includes the steps of designating a program execution level at a lower level for a normal operation of the program, classifying the execution of a plurality of ESD steps which are provided between particular two checkpoints by designated program execution level and changing the program execution level so as to increase the number of the ESD step execution if an error status is detected during the execution of the program between particular two checkpoints for specifying the position of the error status as early as possible.

A characteristic feature of the method of the present invention for detecting a error status in a program is to increase the program execution level for specifying the position of the error.

In the checkpoint restart type computer system, it is possible to eliminate a bug by rolling back the execution to the prior checkpoint of the two checkpoints, if a bug is a transient error which depends upon a timing, the error status can be eliminated by the restarted execution of the program.

Figure 11A:
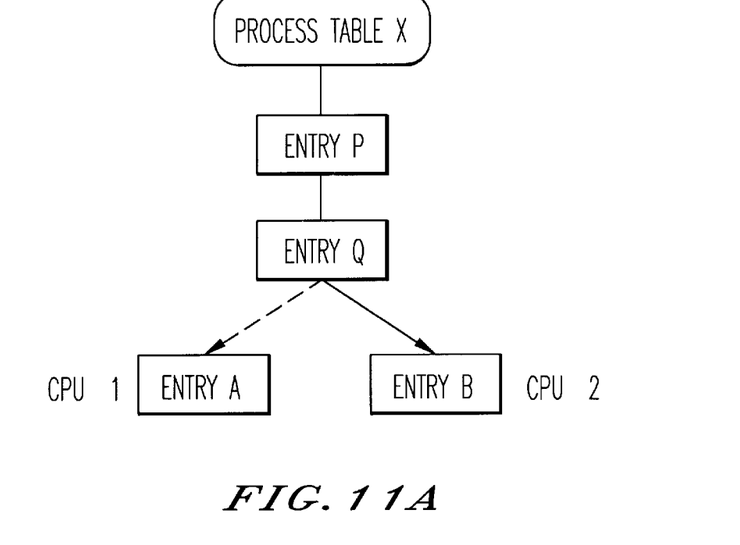
Figure 11B:
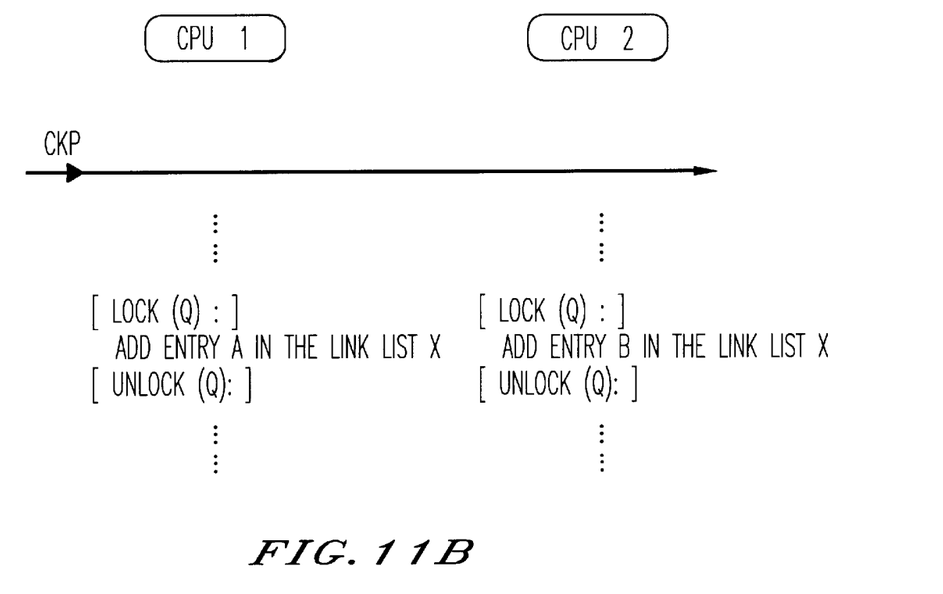

Usually, such a timing dependent transient error occurs among parallel processing. FIGS. 11(a) and 11(b) illustrate an example of the occurrence of the timing depended transient error.

FIG. 11(a) shows an example process table X which includes two link lists of the entries P and Q. In this case, when the different processors CPU1 and CPU2 instruct respectively to add another entry to the list, a programmer needs to insert a LOCK instruction before instructing the addition of the entry as shown in FIG. 11(b).

If the programmer forgot to insert such a LOCK or UNLOCK instruction, it is a possible problem that additions of the different CPUs will occur at the same time as designating the same list. This causes a problem for the system. This kind of timing dependent transient error can be eliminated by restarting the executed operation from a checkpoint.

As explained above, the apparatus and method according to the present invention can keep a higher operational speed during a primary operation of the system and also can detect a particular position of the error status as quickly as possible during a debugging operation.

In the embodiment, the execution levels are designated as under less than some level, for example, like under the level 1 or under the level 2.

But it is of course possible to designate the execution level as more than a particular level. In this case, for changing the execution level, the designations of the levels will be decreased in order to specify the particular module having a bug.

What is claimed is:

1. A checkpoint and restart type computer system for executing a program in which at least two checkpoints are acquired and the program is restarted from a previous checkpoint acquired before an appearance of an error state, comprising:

a memory for storing the program which includes a plurality of error state detecting (ESD) sequences between the checkpoints, each of the ESD sequences containing an error state checking sequence and a designated execution level for the sequence;

a processor for executing the program and maintaining an image of the previously located checkpoint;

means for designating an execution level for the program, including a table for setting an allowed execution level for respective ESD sequences;

means for classifying the execution of the plurality of ESD sequences by comparing the designated execution level for the program and the allowed execution level for the ESD sequences; and means for changing the execution level for the program only when a debugging operation is requested so as to increase the frequency of the execution of the ESD sequences for detecting a particular position of an error when the processor detects the ESD sequence during the execution of the program;

wherein the means for classifying controls the execution of the ESD sequence in the program to occur if the designated execution level for the program is higher than the allowed execution level for the ESD sequence.

2. A checkpoint and restart type computer system according to claim 1, wherein the ESD sequence contains a module identification, a designated execution level, conditions for judging an error state, and a postprocessing operation identification after detecting the error state, and the means for classifying judges the ESD sequence with reference to the conditions before executing the ESD sequence.

3. A checkpoint and restart type computer system according to claim 1, wherein the means for designating gradually increments the execution level for the program from a lower level to a higher level so as to increase the frequency of the execution of the ESD sequences.

4. A checkpoint and restart type computer system according to claim 3, wherein the means for designating increments the execution level for the program by a particular amount.

5. A checkpoint and restart type computer method for executing a program in which at least two checkpoints are acquired and the program is restarted from a previous checkpoint acquired before an appearance of an error state, comprising the steps of:

storing the program which includes a plurality of error state detecting (ESD) sequences between the checkpoints, each of the ESD sequences containing an error state checking sequence and a designated execution level for the sequence;

executing the program and maintaining an image of the previously located checkpoint;

designating an execution level for the program, including a table for setting an allowed execution level for respective ESD sequences;

classifying the execution of the plurality of ESD sequences by comparing the designated execution level for the program and the allowed execution level for the ESD sequences;

changing the designated execution level for the program only when a debugging operation is requested so as to increase the frequency of the execution of said ESD sequences for detecting a particular position of an error when a processor detects the ESD sequence during the execution of the program; and said classifying step comprising controlling the execution of the ESD sequence in the program to occur if the designated execution level for the program is higher than the allowed execution level for the ESD sequence.

6. The method according to claim 5, wherein the classifying step comprises:

judging an error state under a condition which is contained in the ESD sequence before deciding the execution of the ESD sequence.

* * * * *